United States Patent

[11] 3,582,569

[72] Inventor Marcel Jules Helene Staar
Brussels, Belgium
[21] Appl. No. 662,917
[22] Filed Aug. 24, 1967
[45] Patented June 1, 1971
[32] Priority Aug. 31, 1966
[33] Belgium
[31] B.32,792
Pat. 686,264

[54] SELECTING APPARATUS FOR THE REPRODUCTION OF MULTITRACK MAGNETIC TAPES
17 Claims, 26 Drawing Figs.

[52] U.S. Cl. 179/100.2, 179/100.2 Z
[51] Int. Cl. G11b 15/06;
[50] Field of Search 179/100.2 S, 100.2 MI, 100.2 Z

[56] References Cited
UNITED STATES PATENTS

| | | | |
|---|---|---|---|
| 2,396,409 | 3/1946 | Berzer | 179/100.2 |
| 3,037,093 | 5/1962 | Nowlan | 179/100.2 |
| 3,210,864 | 10/1965 | Tillotson III | 179/100.2 |

FOREIGN PATENTS

| | | | |
|---|---|---|---|
| 810,111 | 3/1959 | Great Britain | 179/100.2 |

*Primary Examiner*—Bernard Konick
*Assistant Examiner*—J. Russell Goudeau
*Attorney*—Waters, Roditi Schwartz & Nissen

ABSTRACT: Reading heads for the reproduction of multitrack magnetic tapes in cassettes are controlled by keys which cause recordings on the playback tracks to be sent o to playback amplifiers whereas signals on identification tracks are sent to an amplifier which controls a rapid search device to initiate normal playback at proper speed when the signal produced by he the depressed correlates with an identification signal on the tape.

PATENTED JUN 1 1971 3,582,569

SHEET 09 OF 10

SELECTING APPARATUS FOR THE REPRODUCTION OF MULTITRACK MAGNETIC TAPES

My invention relates to apparatus for the reproduction of multitrack magnetic tapes, inter alia those normally provided for stereophonic reproduction, the invention also relating to tapes having special features for use in these apparatuses, and to cassettes containing tapes of the kind specified.

The apparatus according to the invention is mainly characterized in that means are provided for the reading of the tapes, one or two tracks of the tapes bearing sound recordings separated by intervals, while another track bears signals at places corresponding to the interval of each other track and to the start of the tape, these signals being in each case a signal for moving the tape at top speed, preceding in each case a group of signals whose function is to make the tape move at the normal playback speed, and a device is provided for selecting the recording which is to be played back, the selector device comprising a certain number of keys acting via an electronic block whose operation is such that the recordings of each playback track is sent to one or more playback amplifiers put in circuit only for playback at the normal playback speed of the tape, whereas the signals of the other tracks are sent to an amplifier which controls a rapid search device and brings the apparatus to the normal playback speed as soon as there is agreement between one of the numbers of the recordings requested and a group of identification signals, and automatic or manual means are provided such that when the apparatus is not used with a selector-type cassette, the part of the reading head used for the signals can be used for reading the normal recordings when the tape moves in one direction or the other.

In the practical embodiment of the invention the putting into circuit of the electronic block takes place or is executed in cooperation with bosses on the cassettes of the "selector type" so that when an ordinary cassette is introduced, an inverter or equivalent member remains in a position in which the signals of one or more tracks of the magnetic tape collected by the magnetic head are sent to each playback amplifier, whereas if the cassette is of the selector type, the said member acts on the inverter or similar member so that the musical signals of at least one track are sent directly to each sound amplifier, while the signals of another track (identification signals) are sent to the electronic block, and other bosses on the cassette act on means which unlock the keys and identify the face (face identification means) when the cassette is of the selector type, the tape being moved at the normal playback speed when there is agreement between the selection requested and established by a key, and the signals of the track.

The invention will be better understood from the following description of a number of nonlimitative exemplary embodiments thereof, with reference to the drawings, wherein:

In FIG. 1, the tape moves in only one direction, while in FIG. 1A it moves in both directions.

Figures 1, 1A, 2:
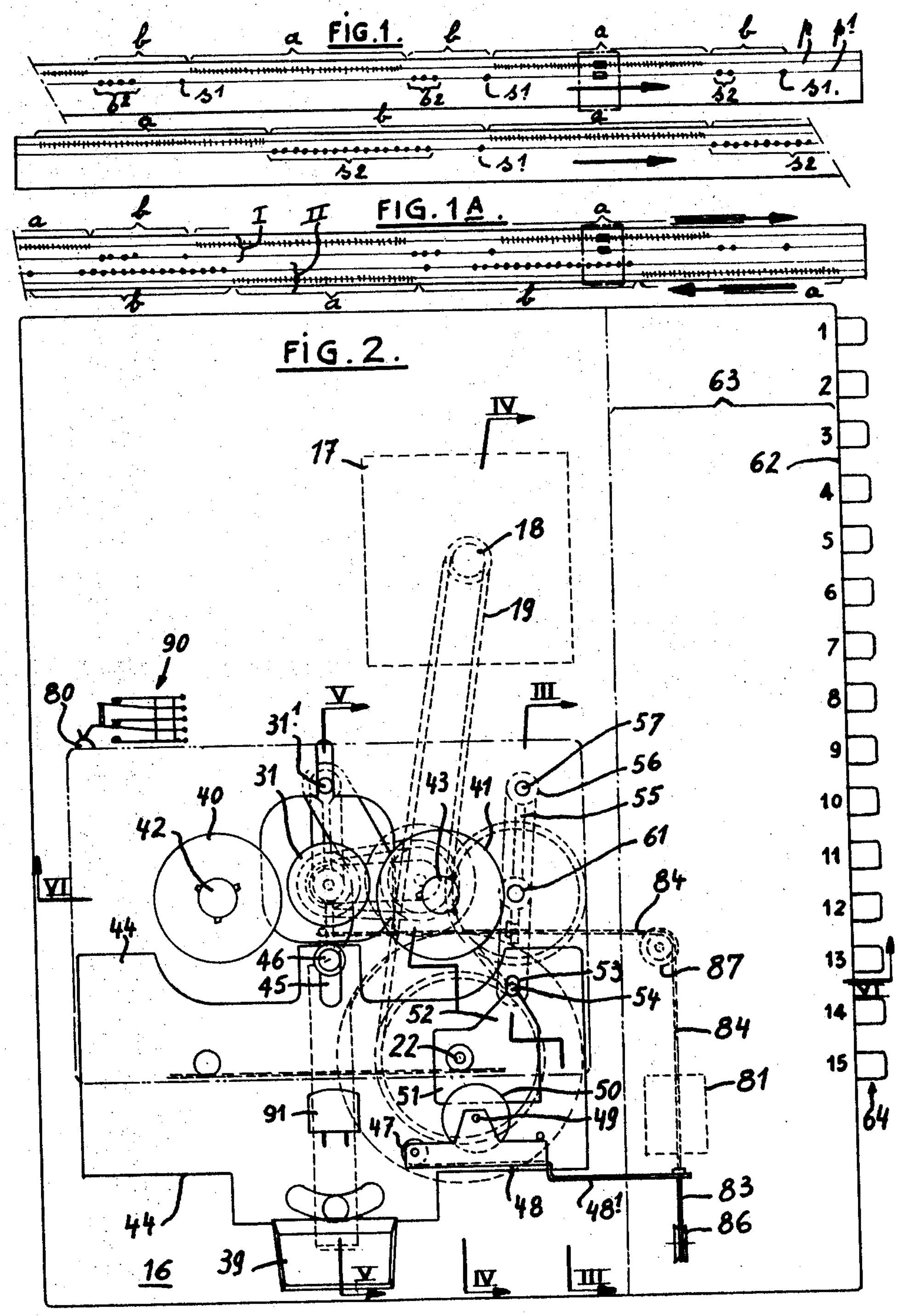
FIGS. 1 and 1A show magnetic tapes according to the invention adapted to be used in the apparatus.
FIG. 2 is a diagrammatic play view of the apparatus.

FIGS. 3—6 are sections, taken respectively along the lines III-III, IV-IV, V-V and VI-VI in FIG. 2.

Figure 7:
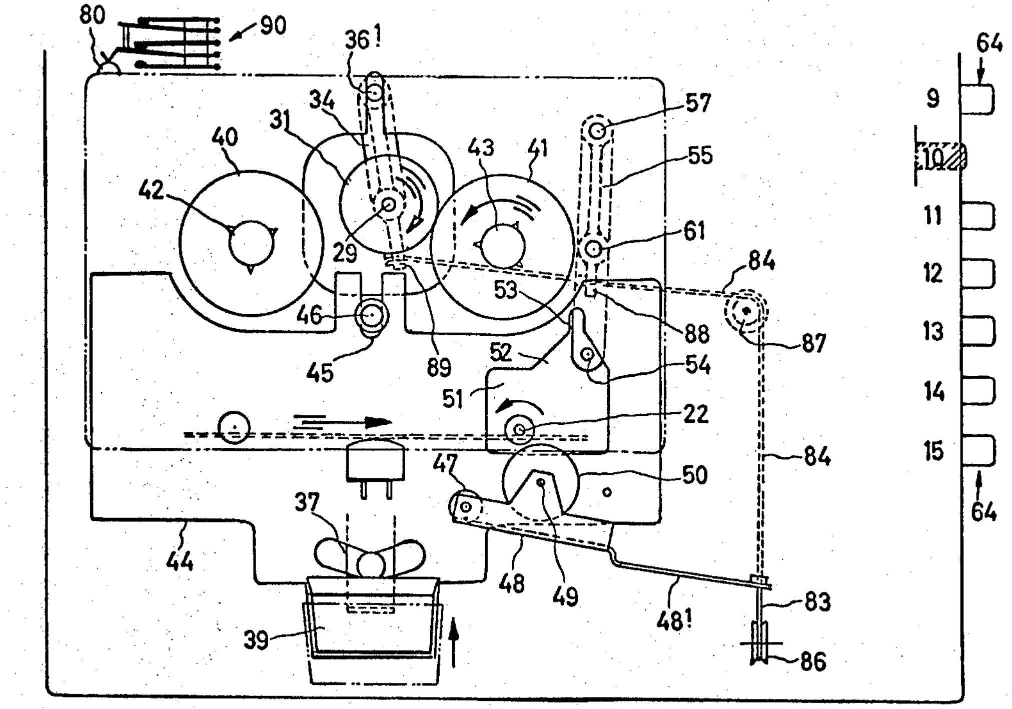
Figure 8:
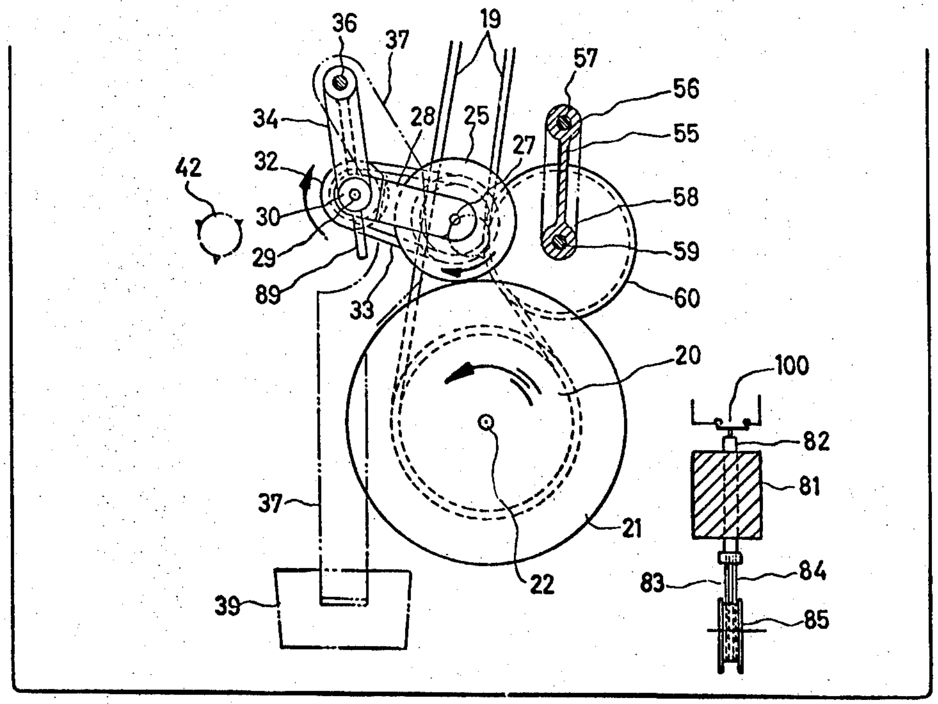

FIGS. 7 and 8 show the arrangement of the mechanical elements when the apparatus is moving rapidly.

Figure 9:
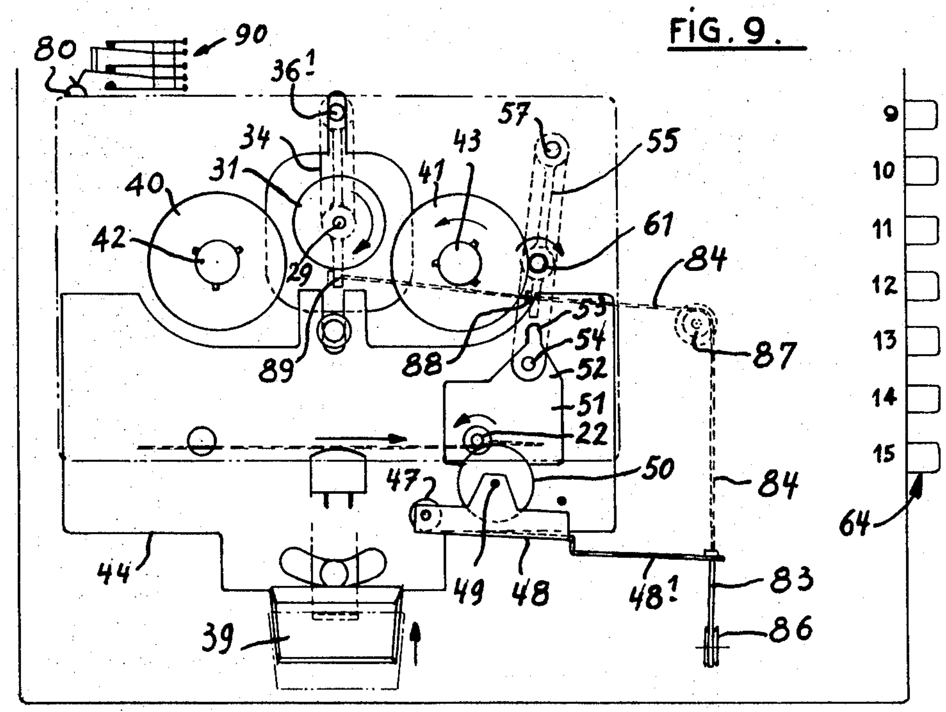
Figure 10:
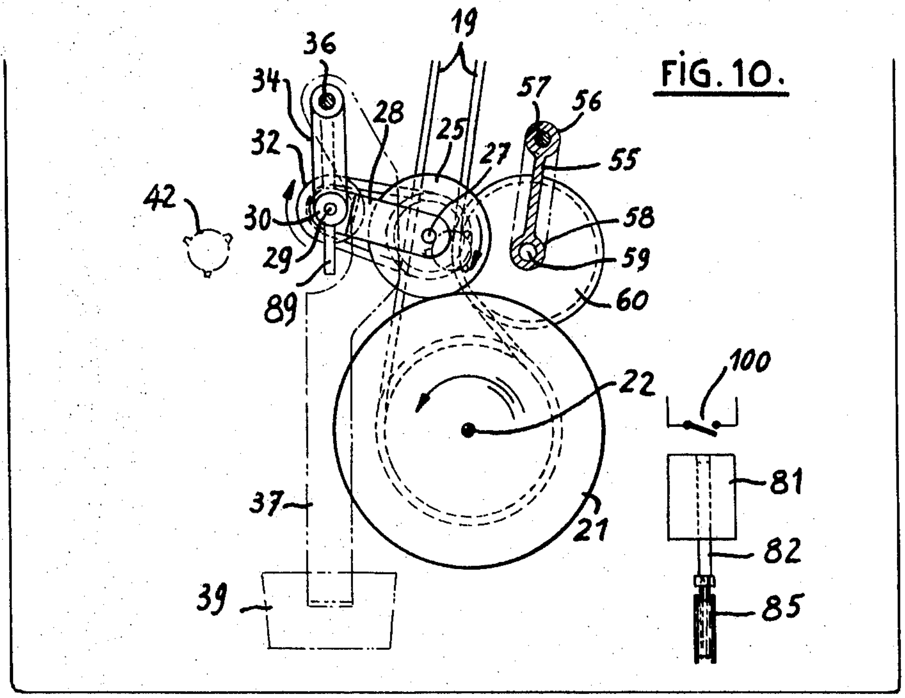

FIGS. 9 and 10 are views corresponding to FIGS. 7 and 8, respectively, and show the apparatus moving at the normal playback speed.

FIGS. 11—18 are detail views of portions of the apparatus for explanatory purposes.

Figure 19:
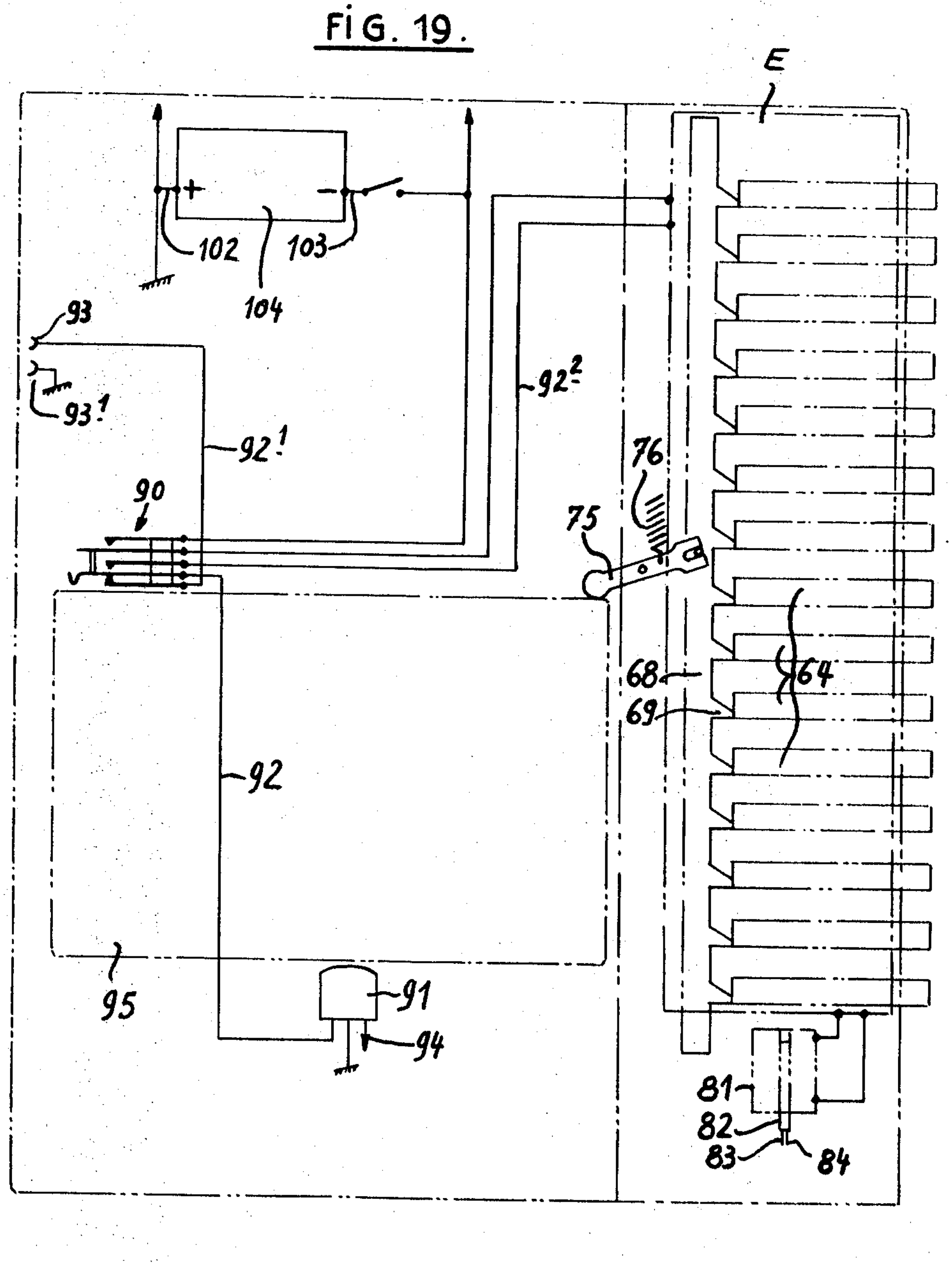
Figure 20:
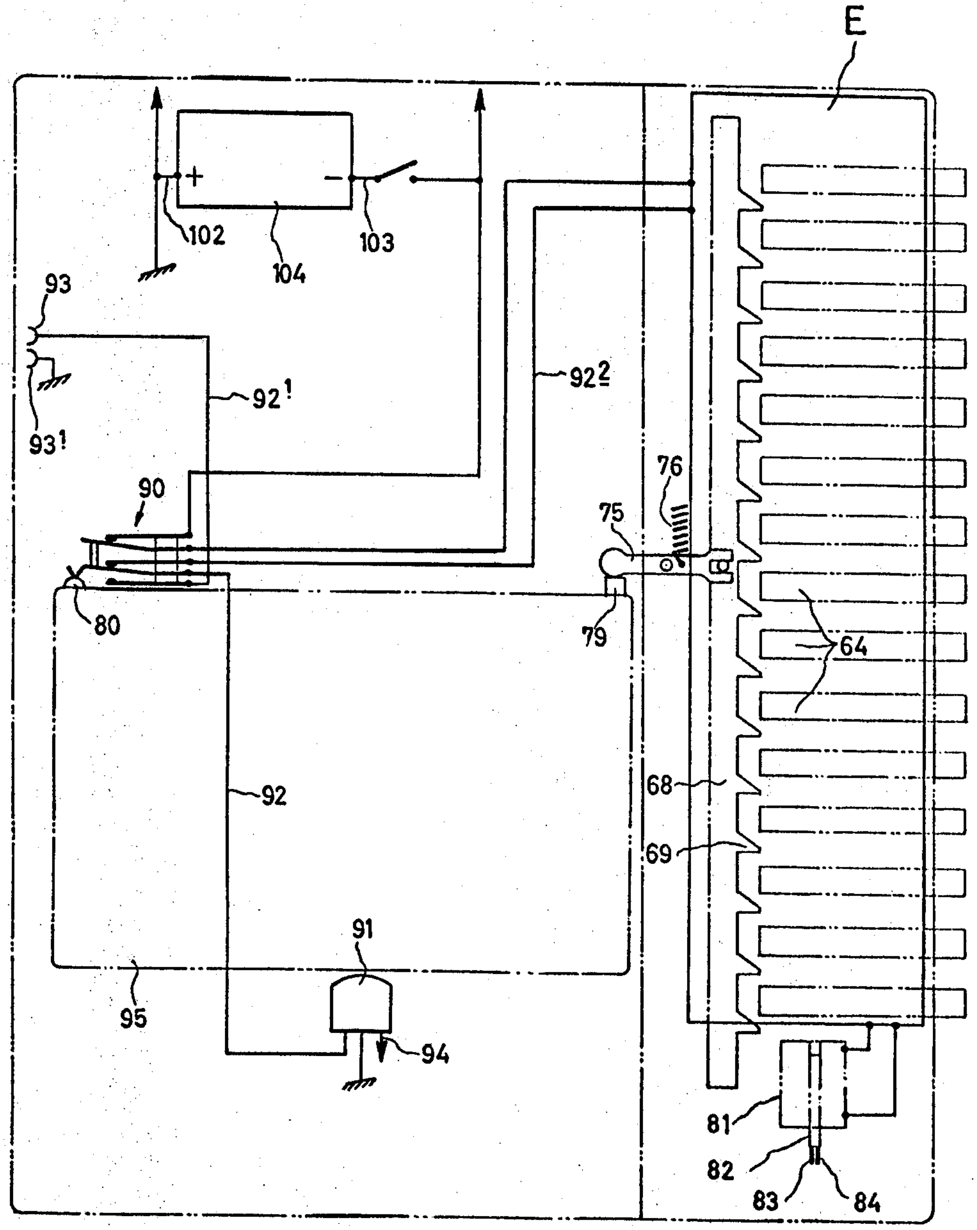
Figure 21:
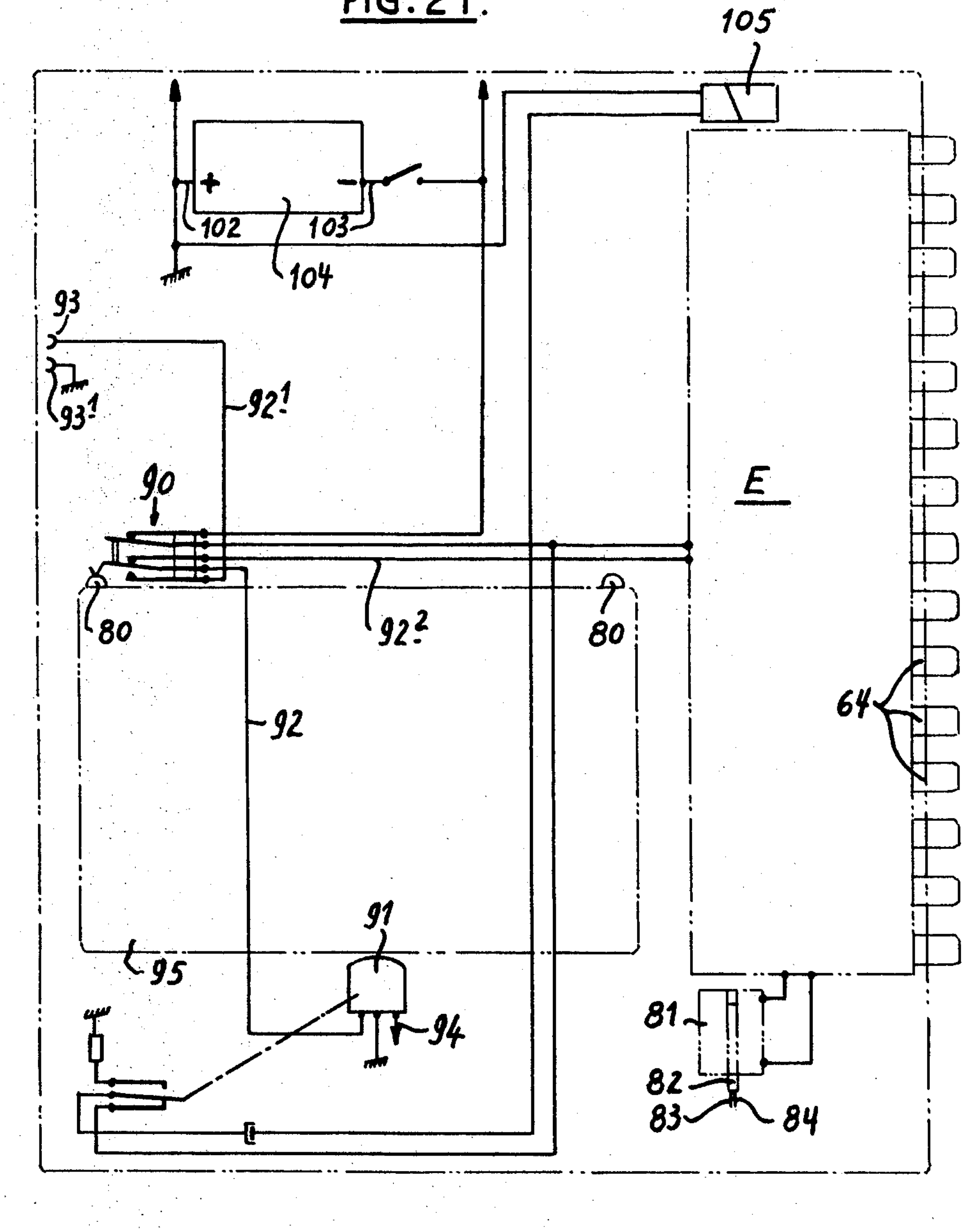

FIGS. 19—21 are simplified electrical diagrams, and

Figure 22:
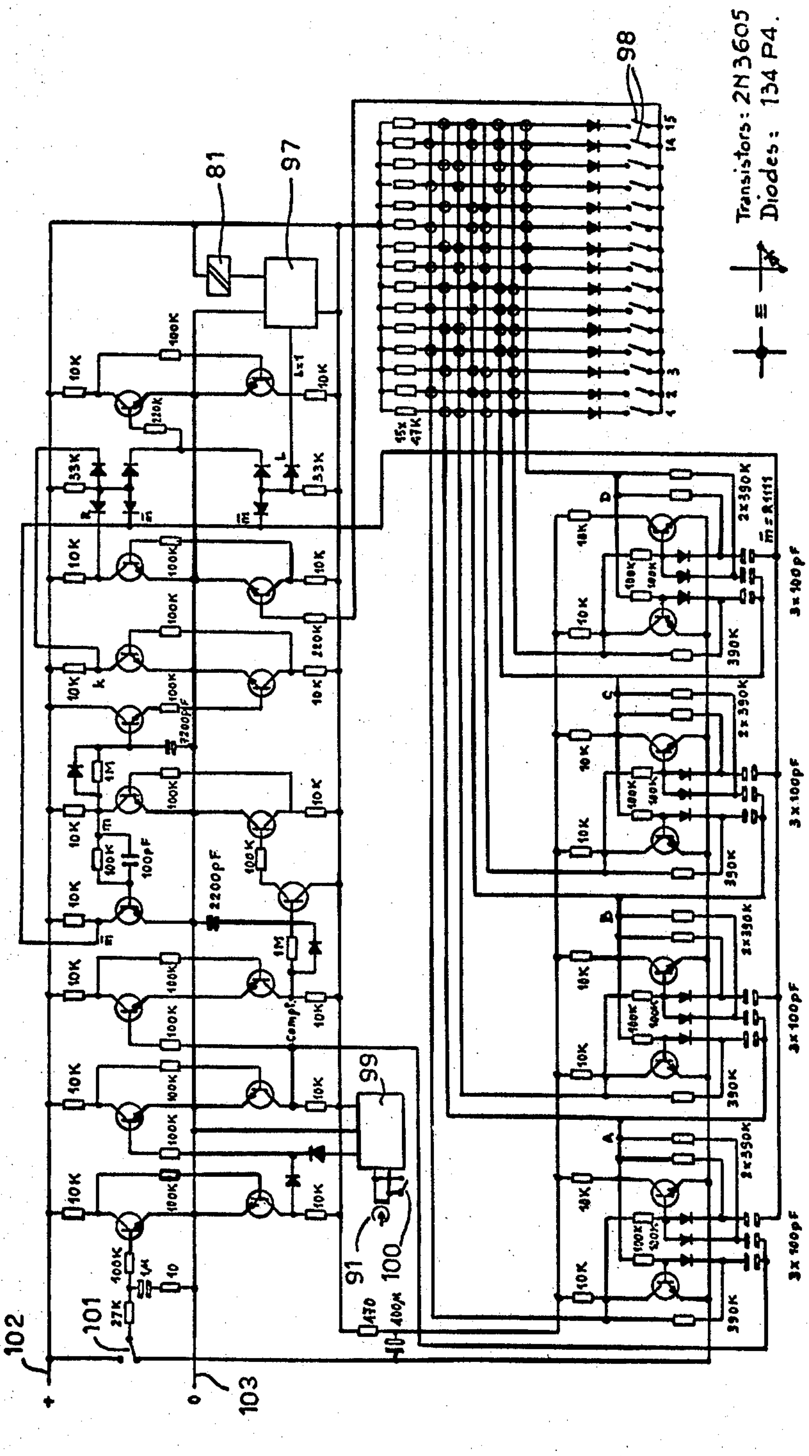

FIG. 22 is a complete electrical diagram of the apparatus, including the electronic block E, the latter being given by way of example.

The invention does not relate to the electronic block itself, which can be designed in accordance with the knowledge of an engineer in that art, but does relate to the cooperation of the electronic block with, and its adaptation to the assembly of electric and mechanical elements, such cooperation and adaptation being adequately described and illustrated to enable the invention to be embodied.

FIG. 2 shows in a relatively diagrammatic way, a recording or playback apparatus 16, comprising a motor 17, having a pulley 18 which is keyed to the motor shaft and over which there extends a belt 19 driving a pulley 20 (FIG. 4) unitary with a flywheel 21, the apparatus 16 also comprising a capstan 22 rotating in a bearing 23 attached to a frame 24.

Figures 5, 6:
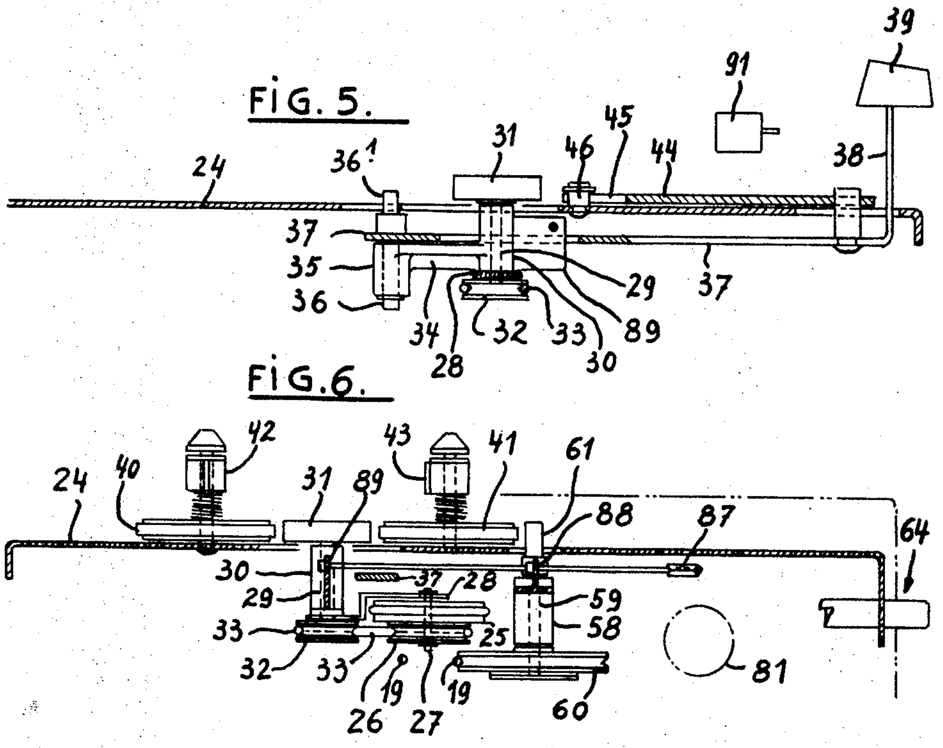

A pulley 25 unitary with a pulley 26 comes into frictional contact with the flywheel 21. The pulleys 25, 26 are mounted on the same shaft 27 attached to a support 28 which can oscillate around a spindle 29 received in bush 30 (FIG. 6).

A pulley 31 is attached to the upper part of a spindle 29 and a pulley 32 driven by a belt 33 extending over the pulley 26 is unitary with the bottom part of the spindle 29.

Unitary with the bush 30 is a lever 34 which can oscillate by means of a bush 35 around a spindle 36 unitary with a flat member 37 which is disposed horizontally and folds upwards to form a vertical arm 38 to which an operating button 39 is attached.

The pulley 31 occupies a position such that it can be brought into contact with and entrain either a pulley 40 or a pulley 41; each of the pulleys 40, 41 bears a nucleus 42 or 43 cooperating with the hubs of the spools for winding and unwinding the cassette (FIGS. 2 and 9).

Slidably mounted on the frame 24 (FIGS. 2, 5, 7 and 9) is a plate 44 formed with a groove 45 in which a guide nipple 46 engages which is unitary with the frame 24. The plate 44 also bears a vertical shaft 47 around which a U-shaped member 48 can pivot between whose branches there extends a spindle 49 on which a roller 50 can rotate.

Figure 3:
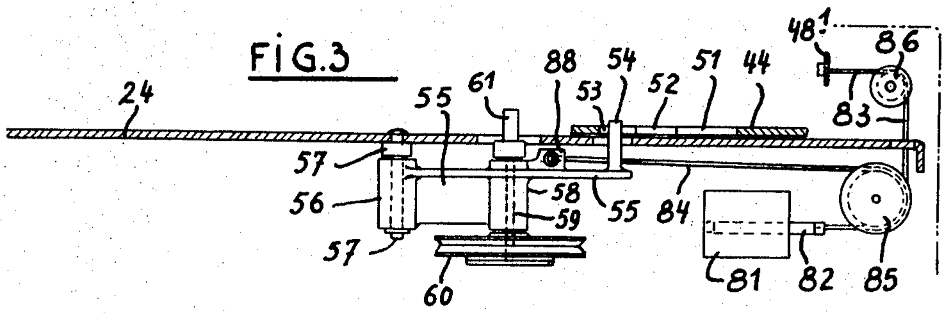
Figure 4:
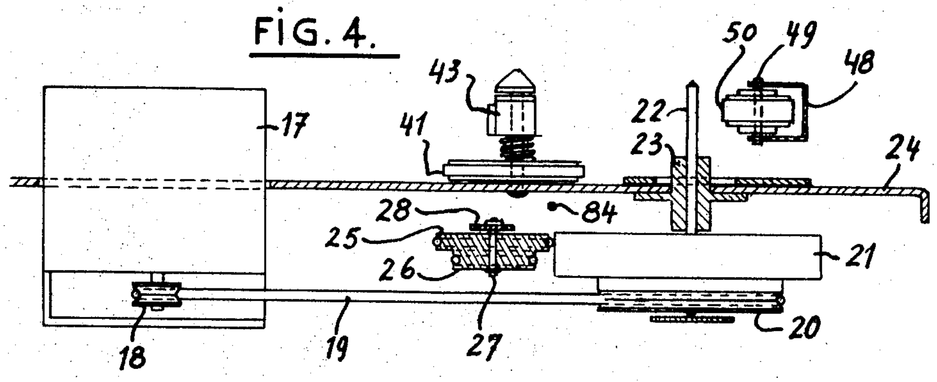

The plate 44 is formed with a substantially rectangular aperture 51 having on the edge pointing towards the nuclei 42, 43 a triangular cutaway portion 52, the top of which is formed with a groove 53 in which there engages a rod 54 borne by a lever 55, articulated via a bush 56 to a spindle 57 unitary with the frame 24 (FIG. 3).

Towards the center of the lever 55, there is a bush 58 through which a spindle 59 extends which bears at its bottom end a pulley 60 driven by the belt 19 (FIGS. 8 and 10) and applied thereagainst by a spring (not shown).

The spindle 59 terminates at the top in a stub axle 61, which during normal operation (FIG. 9) rubs against the rim of the pulley 41 to rotate the pulley 41 and entrain the nucleus 43 engaging in the hub of the spool.

According to the invention, along one edge 62 of the casing, whose width is increased in relation to that of the casing of the known apparatus (as shown at 63 in FIGS. 2 and 12) there are provided a certain number of keys 64 (15 in the embodiment illustrated) each having a head 65 (FIGS. 11 and 12) and extending through a bar 66 borne by two transverse members 67.

Parallel with the bar 66 extends a rod 68 having on the side of the keys teeth 69, the same number of teeth being provides as keys; the rod 68 is mounted at its ends so that it can slide in the transverse members 67.

Fixed to each of the keys 64 to ensure their position is a magnet 70 which can come into contact either with a rod 71 (with the button pulled out) or with a rod 72 (with the button pushed in) during the sliding of the key 64.

Approximately at its center, the rod 68 bears a tenon 73 (FIGS. 12A—13A) engaging in a fork 74 forming part of the lever 75 subject to the force of a spring 76 which can pivot via a bush 77 around the spindle 78 borne by the casing. The lever 75 can pivot in relation to the cassette, since according to the invention the cassette may have two types of bosses 79, 80 of different heights, whose purposes will be explained hereinafter.

Referring to FIGS. 2 and 3, a relay 81 is provided whose armature 82 is connected to two cables 83, 84 both passing over a return pulley 85. The cable 83 then passes over another return pulley 86 and is attached to a shoe 48' fixed to the U-shaped member 48 the pressure roller 50. The cable 84 passes over a return pulley 87 and is connected to a shoe 88 forming part of the lever 55, the cable 84 then passing over a shoe 89 forming part of the lever 34 bearing the wheel 31.

The diagrammatic FIGS. 19—21 show current-feeding conductors 102, 103 connected to a battery 104.

In FIG. 21 the keys are reset to zero electrically by an electromagnet 105 energized when the cassette 95 is removed.

FIG. 1 shows a magnetic sound tape having two tracks $p$ and $p^1$, only one $p$ of which bears sound recordings $a$, separated by intervals $b$, while the other track $p^1$ bears only signals $s$ at places corresponding to the interval $b$ of the other track and to the start of the tape, these signals being in each case the signal $s^1$ for moving the tape at top speed, preceding in each case a group of signals $s^2$ whose function is to make the tape move at the normal playback speed.

The recording whose playback is desired can be selected by means of the keys 64, which exert their action via an electronic block.

In their succession, these groups of selecting signals have in each case a number of tops increased by one unit; each group therefore comprises a number of tops, plus one corresponding to the order number of recording.

Clearly, therefore:

a. one of the two tracks comprises only magnetic signals giving indications regarding the identification and relative position of musical or other recordings provided on the other track;

b. a first magnetic signal situated on the signal track before the identification signals gives information as to the end of the preceding recording or the start of a recording;

c. the information indicating the end of recording shows that the following information will be identification information.

The electronic system is so designed that for purpose of counting, two signals or tops succeeding one another must pass between a minimum and maximum time.

If these standards are not respected, the signal is not interpreted as a counting signal, and the electronic device is allowed to reset itself at zero to start a further counting whose tops must again fall within the standards, so that parasite signals not falling within these limits are not interpreted.

To increase its capacity, the tape can comprise two groups of recording and signal tracks (I—II in FIG. 1A), each group corresponding to one direction of movement of the tape. The recordings can be the same or different in each direction.

The apparatus is designed to operate both with ordinary cassettes and selector-type cassettes.

To this end, for instance, the front surface of the cassette (FIGS. 15—18) is formed with bosses 79—79$^1$ and 80 only when the tape contained in the cassette is of the selector type, while the bosses are not used when the tape is not selective.

The bosses 79, 79$^1$ are of different heights, and in the embodiment illustrated they are disposed in diagonally opposite positions on the small front surface 94 of the cassette 95 (FIGS. 13—16), thus providing a simple device which informs the user of the side of the tape which is used, due to the fact that the bosses act in a different manner on a small indicating plate 96 showing different indications (autom. 1, autom. 2 in FIGS. 13—14), thus enabling the signals to be brought into agreement with lists relating to each of the sides of the tape.

To this end, the apparatus comprises a double inverter 90 which is actuated only by the bosses 80, therefore only in cases where selector-type cassettes are used. When an ordinary cassette is introduced the inverter 90 remains in the position shown in FIG. 19 and the signals of the first track of the magnetic tape collected by the magnetic head 91 are sent via the wire 92—92$^1$ to terminals 93—93$^1$ connected to the musical amplifier, while the signals of the second track of the tape also collected by the magnetic head 91 are sent directly to the sound amplifier via the wire 94.

If the cassette introduced is of the selector type, the boss 80 acts on the double inverter 90 (FIG. 20) so that the signals of the first track, which are the musical signals, are sent directly to the sound amplifier via the wire 94 while the signals of the second track, which are precisely the identification signals $s^1$ and $s^2$ and which are also collected by the head 91 are sent via the wires 92, 92$^2$ to the electronic block E.

The bosses 79 or 79$^1$ act on the levers 75 to make it assume two different positions (Autom. 1 or Autom. 2), in dependence on whether tracks I or II of the tape are played.

Figure 12:
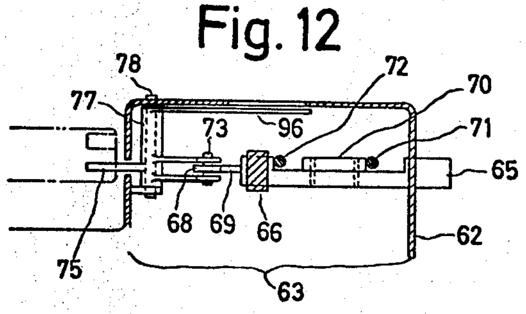
Figure 11:
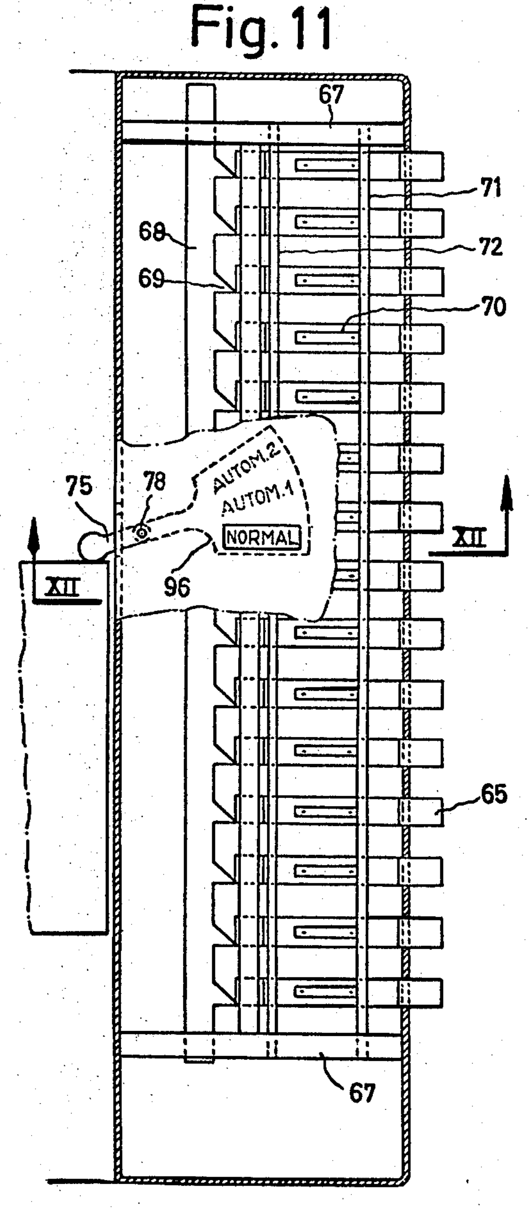
Figure 12A:
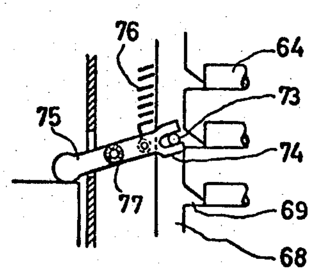
Figure 13A:
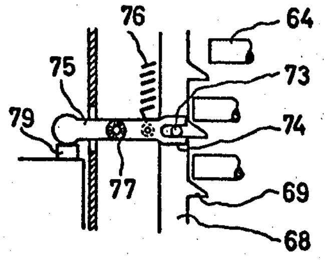
Figure 14A:
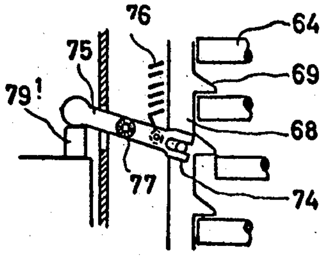

When the cassette is of the ordinary type, the various keys 64 are locked and any pressure exerted on the key remains without effect, since the teeth 69 of the rod 58 form a stop for the movement of the keys (FIGS. 11—12 and 12A).

Figures 13, 14, 15, 16, 17, 18:
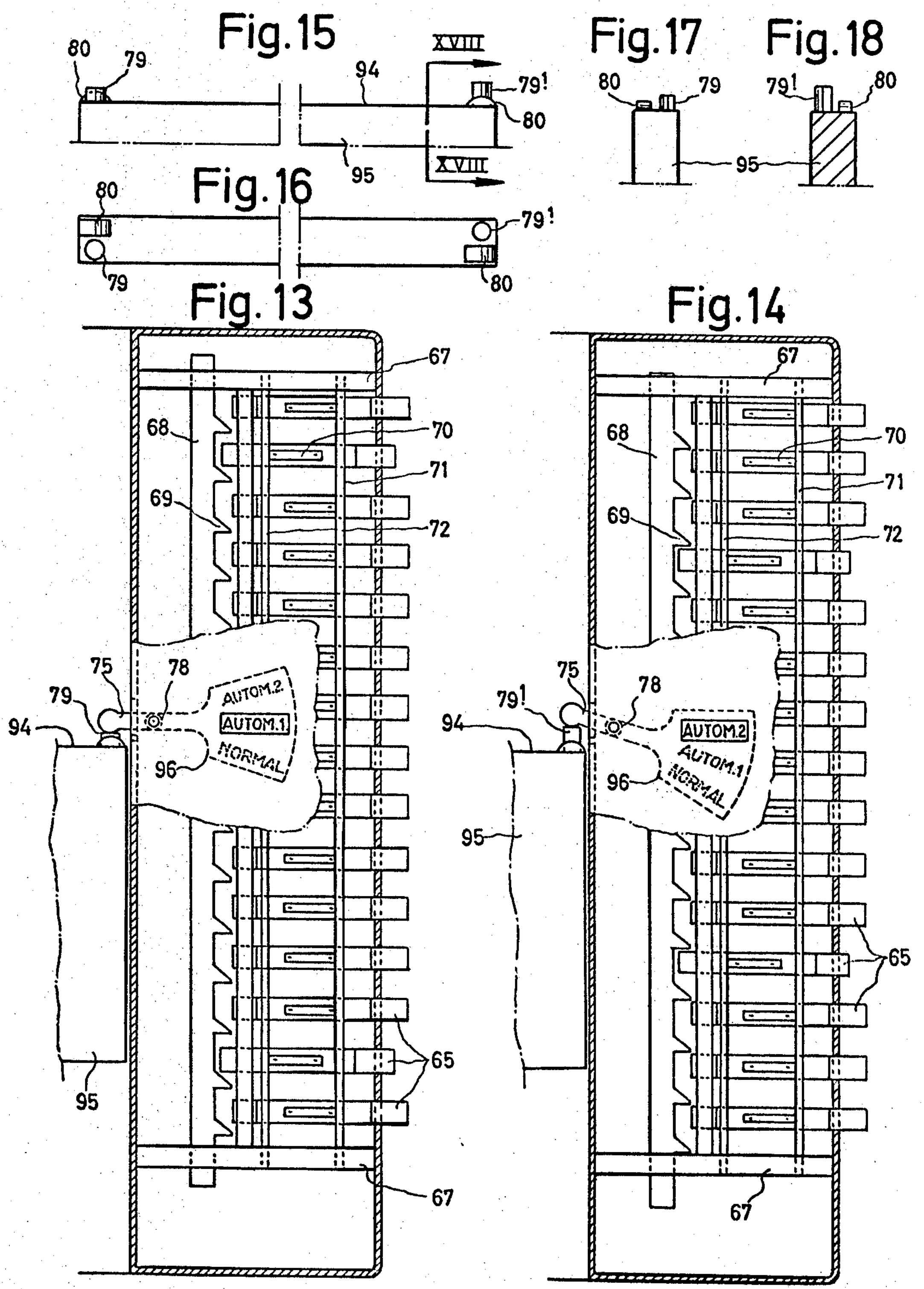

On the contrary, if the cassettes are of the selector type, the levers 75 actuated by the bosses 79 or 79$^1$ cause the rod 68 to slide so as to bring the teeth 69 into a position in which the keys can be pushed in to perform a selection (FIGS. 13—13-A—14—14A).

When the starting button 39 (FIGS. 7 and 8) has been depressed, and also one or more of the selector buttons 64, the electromagnet 81 which has been energized acts on the armature 82 and exerts a pull on the cables 83, 84, so that:

1—the pressure roller 50 which would force the magnetic tape against the capstan is pulled back and releases the tape;

2—the cable 84 exerts a pull on the lever 55 bearing the shaft 61 driving the pulley 41 and releases the latter, which is then entrained at high speed by the pulley 31 borne by the lever 34 which has been displaced by the cable 84.

When a selector-type cassette 95 is removed from the apparatus, and the bosses 79—79$^1$ can no longer act on the lever 75, the same is returned by the force of the spring 76 into the position shown in FIG. 19, so that the rod 68 returns the keys 64 to the locking position.

As can be seen in the diagram in FIG. 22, the keys 64 act on switches 98, each key when pushed in closing the switch corresponding to the numbers chosen.

The electronic block shown in FIG. 22 acts on the electromagnet 81 which either makes the tape move rapidly when searching for a recording, or makes it move at the normal playback speed as soon as there is agreement between a group of identification signals $s^2$ and the number of a recording chosen by the keys 64.

A power amplifier 97 is interposed between the electronic block E and the electromagnet 81 controlled by the electronic block E.

The pulses captured by the signal head 91 pass through a reading amplifier 99 to control, via the electronic block E and the power amplifier 97, the electromagnet 81 which makes the apparatus work at high speed as soon as the signal head 91 has captured a signal or top $s^1$ and becomes inoperative—i.e. returns the apparatus to its normal playback speed, as soon as the signal head captures a group of pulses $s^2$ corresponding to one of the keys which is pushed in, namely the number of the switch 98 closed by a key 64.

The pulse $s^1$ makes the apparatus operate rapidly, unless it is already doing so.

When the apparatus is moving rapidly, a switch 100 (FIG. 8) short circuits the output of the playback head so that the noise produced by excessively fast movement of a recording is inaudible during the searching period.

The electronic block E will interpret the signals $s^2$ as actual counting only if the spacing between two of the signals or tops falls within well-defined standards of time. This is so that parasite signals, of no matter what nature, have only a very slight chance of falling between these narrow limits and being erroneously interpreted as counting signals.

An inverter 101 (reject) has the same influence on the electronic block E as a top $s^1$, and enables the apparatus to be brought into the state of rapid search for the next number chosen or the end of the tape at any time.

In FIG. 22 the current is fed via the wires 102—103.

What I claim is:

1. Apparatus for reproducing a multitrack magnetic tape in ordinary and selector-type cassettes being constituted of sound tracks bearing sound recordings separated by nonsound intervals, and a signal track bearing signals at intervals corresponding to the nonsound intervals in said sound tracks, said signals being constituted of first signals for moving the tape at rapid speed, and second signals for identification and moving the tape at normal playback speed, said first signals preceding said second signals, said apparatus comprising reading means for reading the sound recordings of said sound tracks, and selector means operatively associated with said sound and signal tracks for selecting a particular recording to be played back, said selector means comprising electronic circuit means comprising electronic circuit means, a plurality of keys operatively associated with said electronic circuit means for signaling selected recordings, at least one playback amplifier coupled with said keys and said sound track for playback at the normal playback speed, a further amplifier coupled with said keys and said signal track, and rapid search means comprising drive means coupled with said further amplifier to be controlled by said signals to move said tape at rapid speed in locating selected recording and to bring said tape to normal playback speed upon agreement between the recording requested by a selected key and a group of said second signals in said signal track, said reading means being adapted for reading a recording track of an ordinary cassette corresponding in position to that of said signal track of said signal track of a selector-type cassette.

2. Apparatus as claimed in claim 1, wherein said selector-type cassettes include bosses projecting therefrom, said apparatus further including an inverter member engageable by said bosses and coupled with said selector means such that when a selector-type cassette is introduced said bosses act to displace said inverter member to cause said sound recordings to pass directly to said playback amplifier and said signals to said electronic circuit, and when an ordinary cassette is introduced said inverter member remains in position to cause the sound track recording corresponding in position to that of the signal track of the selector-type cassette to pass to said playback amplifiers, and locking means for locking said keys in position when an ordinary cassette is introduced, the selector-type cassettes including further bosses for engaging said locking means to displace and unlock same.

3. Apparatus according to claim 1 including a manual inverter operatively associated with said selector means so that when an ordinary cassette is used, the inverter remains in a position in which the sound recordings of sound tracks of the ordinary cassette tape are sent to each playback amplifier, whereas when the cassette is of the selector type, the inverter is brought into a different position, which enables the sound recordings to be sent directly to each sound amplifier, while the signals of the signal track are sent to the electronic circuit.

4. Apparatus according to claim 1, in which the selector means comprises at least one key extending through a bar borne by transverse members, and extending parallel to the bar is a sliding rod on the side of the keys with teeth equal in number to the number of the keys, the teeth constituting a stop for the movement of the key when the cassette is of the ordinary type, and when the cassette is of the selector type the teeth are brought by the sliding of the rod into a position in which it is possible to push in the keys to make a selection, the rod being slid by bosses borne by the cassette.

5. Apparatus according to claim 4 in which the movement of the sliding rod is controlled by a lever pivoting in relation to the bosses on the cassette, and approximately at its center the sliding rod bears a tenon engaging in a fork constituting part of a lever which can pivot around a spindle borne by the casing, the lever pivoting in relation to the bosses on the cassette.

6. Apparatus according to claim 1 comprising a relay including an armature connected to two couplings one of which is connected to a U-shaped member bearing a pressure roller, the other coupling being in connection with a lever bearing a wheel which can be brought into contact with and entrain one of a number of pulleys bearing a nucleus cooperating with spools for winding and unwinding the tape.

7. Apparatus according to claim 6, in which a first magnetic signal located on the signal track before the identification signals gives information of the end of the preceding recording and the beginning of another recording and therefore gives information of the speeding up of the tape.

8. Apparatus according to claim 6, in which one of the tracks comprises only magnetic signals giving indications as regards the identification and the relative position of recordings provided on other tracks.

9. Apparatus according to claim 8 wherein the information indicating the conclusion of a recording and the start of another recording indicates that the following information will be identification information.

10. Apparatus according to claim 9, in which the electronic circuit is so constructed and combined with the tracks or recordings or signals such that for a purpose of counting, two signals or tops following one another must move between the minimum and maximum time, and if these standards are not respected, the signal is not interpreted as a counting signal, and the electronic circuit can be returned to zero to start a further counting, whose tops must again fall within the standards if they are to be interpreted.

11. Apparatus according to claim 10, in which when a starting button and a selector button have been operated, an electromagnet which has been energized acts on the armature and exerts a pull on the coupling members such that:

a. the pressure roller forcing the magnetic tape against the capstan withdraws and releases the tape;

b. a pull is exerted on the lever bearing the spindle driving the pulley and releases the pulley, which is then driven at high speed by the pulley borne by the lever which has been moved by the associated coupling member.

12. Apparatus according to claim 11, in which the bosses for unlocking the keys are of different heights and are disposed in diagonally opposite positions on a small front surface of the cassette when the cassette is of the selector type, thus providing means for informing the user of the side of the tape which is being used, this being done by the bosses acting in a different manner on a small indicator plate showing different indications.

13. Apparatus according to claim 12, wherein the selector keys act on switches, each key when pushed in closing the switch corresponding to the numbers chosen, while the electronic circuit on the electromagnet which makes the tape move rapidly when searching for the recording, and makes it move at normal speed for playback, as soon as there is agreement between a group of identification signals and the number of the recording selected by the keys.

14. Apparatus according to claim 13 wherein the pulses captured by a signals head pass through a reading amplifier to control, via the electronic circuit and the power amplifier, the electromagnet which is used for making the tape move at rapid speed as soon as the signals head has captured a signal top and ceases to be operational and returns the apparatus to its normal playback speed as soon as the signals head captures a group of identification pulses corresponding to one of the keys pushed in, namely to the number of the switch closed by a key.

15. Apparatus according to claim 14, wherein when the apparatus operates at rapid tape speed, the output of a playback head is short circuited so as not to transmit the noise produced by the excessively fast movement of a recording during the searching period.

16. Apparatus according to claim 15, wherein the electronic circuit interprets the identification signals as an actual counting only if the spacing between two of these signals falls within well-defined time standards, so that parasite signals have less chance of falling within these narrow limits and being wrongly interpreted as counting signals.

17. Apparatus according to claim 16, comprising a manual inverter which has the same influence on the electronic circuit as a top for enabling the apparatus to be put into a condition of rapid search for the next number selected and the end of the tape at any time.